United States Patent [19]

Mellon

[11] Patent Number: 4,962,151

[45] Date of Patent: Oct. 9, 1990

[54] SILICONE SEALANT COMPOSITIONS

[75] Inventor: Frank A. Mellon, Midland, Mich.

[73] Assignee: Dow Corning Corporation, Midland, Mich.

[21] Appl. No.: 370,361

[22] Filed: Jun. 22, 1989

[51] Int. Cl.$^5$ ................................................ C08K 3/14
[52] U.S. Cl. .................... 524/788; 524/494; 524/493; 524/588; 524/425; 524/430; 524/431; 524/413; 524/445; 524/423; 524/436; 524/437; 524/847; 524/783; 524/789; 524/787; 524/786; 524/785; 524/779; 524/855; 524/853; 524/860; 524/871
[58] Field of Search .............. 524/494, 493, 588, 425, 524/430, 431, 445, 413, 423, 436, 437, 847, 783, 789, 787, 788, 786, 785, 779, 855, 853, 860, 871

[56] References Cited

U.S. PATENT DOCUMENTS 4,239,113 12/1980 Gross et al. .......................... 524/494
4,615,741 10/1986 Kobayashi et al. .................. 524/493

Primary Examiner—Melvyn I. Marquis
Attorney, Agent, or Firm—Edward C. Elliott

[57] ABSTRACT

The pumpability and extrudability of a mixture of linear polymer and filler can be controlled by using a mixture of filler particle sizes. For 100 parts by weight of polymer there is mixed in from 50 to 150 parts by weight of filler mixture, the filler mixture comprising from 0.5 to 50 percent by weight of a large particle size filler having an average particle diameter of from 0.5 to 10 micrometers and from 50 to 99.5 percent by weight of a small particle size filler having an average particle diameter of less than 0.1 micrometers, the large particle size filler having an average particle diameter of at least 10 times the average particle diameter of the small particle size filler. By adjusting the ratio of large particle size filler to small particle size filler, the change in viscosity of the mixture with change in temperature can be controlled.

10 Claims, No Drawings

SILICONE SEALANT COMPOSITIONS

BACKGROUND OF THE INVENTION

1. Field of the Invention

This invention relates to linear polymer compositions containing extending fillers.

2. Background Information

When polymers, particularly silicone polymers are mixed with extending filler such as calcium carbonate to make sealants, the resulting composition can be difficult to pump from the storage container in a consistent manner. This can be a serious quality control problem, particularly when the filler is of a small particle size so that it is semi-reinforcing and gives some physical strength to the sealant.

When polymers and fillers are mixed together in commercial mixing equipment, the mixture temperature rises, due to the energy added from the mixing process. This added heat can also have an effect upon the viscosity of the mixture. If the viscosity changes in an unpredictable manner due to the heat, the obtaining of a consistent viscosity becomes difficult. When the composition of this invention is used to make a sealant, the sealant is commonly pumped from the storage container through tubing and an application nozzle during application. If the viscosity of the sealant increases during pumping because of a rise in temperature, the flow rate is diminished and application of the sealant becomes slower, often too slow to be of practical use.

SUMMARY OF THE INVENTION

Silicone compositions manufactured with fillers have been improved in processability, without loss of physical properties, by use of a mixture of fillers having different particle diameters. The filler mixture consists of from 50 to 150 parts by weight of filler mixture having from 0.5 to 50 percent by weight of the filler mixture of a large particle size filler having an average particle diameter of from 0.5 to 10 micrometers and from 50 to 99.5 percent by weight of the filler mixture of a small particle size filler having an average particle diameter of less than 0.1 micrometers, the large particle size filler having an average particle diameter of at least 10 times the average particle diameter of the small particle size filler.

It is an object of this invention to produce a mixture of polymer and filler which retains a high extrudability, yet also has acceptable physical strength.

It is an object of this invention to produce a mixture of polymer and filler which has a controlled change in viscosity upon change in temperature.

DESCRIPTION OF THE INVENTION

This invention relates to a composition of polymer and filler having improved extrusion properties consisting essentially of (A) 100 parts by weight of polymer having a degree of polymerization of at least 200, (B) from 0 to 5 parts by weight of plasticizer, (C) from 50 to 150 parts by weight of filler mixture, the filler mixture comprising from 0.5 to 50 percent by weight of a large particle size filler having an average particle diameter of from 0.5 to 10 micrometers and from 50 to 99.5 percent by weight of a small particle size filler having an average particle diameter of less than 0.1 micrometers, the large particle size filler having an average particle diameter of at least 10 times the average particle diameter of the small particle filler, and (D) optionally, a cure system for the polymer (A).

When a polymer is mixed with a filler, it is possible for interaction to occur between the polymer and the filler. When silicone polymer, having hydroxyl reactive sites, is mixed with finely divided silica, such as fumed silica, the reaction between the polymer and filler is strong enough to create a "crepe" which is a tough elastomeric mass. This mass has to be worked vigorously on a two roll mill in order to soften it enough for further processing. With the larger particle size extending fillers, such as ground quartz, this reaction does not occur.

In the development of silicone sealants, it has been found that compositions of polymer and extending or nonreinforcing fillers can be used as the physical strengths required by the application are not too high. In the case of some applications however, such as adhesives used to bond glass to building facades, the physical strength of the sealant becomes an important property. One of the methods used in such compositions is the use of fillers which have very small average particle diameters, on the order of less than 0.1 micrometer. These types of fillers give some reinforcement, but are much less in cost than the true reinforcing fillers such as fume silica.

When the average diameter of the small particle size filler approaches the average molecular radius of gyration of the polymer being used, a strong physical interaction between the polymer and the filler particles can take place due to excessive filling of the polymer "free" volume. The mixture may act like an elastic material at some filler levels under condition of high shear rate and/or high temperature, such as when the material is transported by pumping through tubing and application nozzles. One of the practical effects of this interaction is the lowering of the extrudability of the mixture. Extrudability is measured by weighing the amount of material that is forced through a ⅛ inch diameter orifice in one minute under a pressure of 90 psi. It is a useful test for how readily a sealant can be extruded from a storage container under production conditions. The extrudability can be increased by using less of the filler, or by using a filler of much greater particle size, but when this is done, the physical strength of the cured sealant is lowered. The combination of polymer, filler having a large particle size, and filler having a small particle size, results in a composition which has improved extrudability, controlled change in viscosity with temperature changes, and when made into a cured material, an elastomer which does not have a significant loss of physical properties.

A method of controlling pumpability of a mixture of linear polymer and filler consisting essentially of mixing (A) 100 parts by weight of polymer having a degree of polymerization of at least 200, (B) from 0 to 5 parts by weight of plasticizer, (C) from 50 to 150 parts by weight of filler mixture, the filler mixture comprising from 0.5 to 50 percent by weight of a large particle size filler having an average particle diameter of from 0.5 to 10 micrometers and from 50 to 99.5 percent by weight of a small particle size filler having an average particle diameter of less than 0.1 micrometers, the large particle size filler having an average particle diameter of at least 10 times the average particle diameter of the small particle size filler, and (D) optionally, a cure system for the polymer (A). By varying the ratio of large particle size filler to small particle size filler, the change in viscosity of the mixture can be controlled, particularly with changes in temperature.

The composition of this invention contains a polymer which has a degree of polymerization of at least 200, i.e., there are at least 200 repeating monomer units in the polymer. It is believed that the polymer needs to be at least of this size to form the polymer network with which the small particle filler interacts. There is no known upper limit to the degree of polymerization, but after some point, 10,000 for example, the significance of the interaction caused by the filler becomes less significant. The polymers used to form sealants are generally of a degree of polymerization of 200 to 2000 or so since the polymers are flowable fluids which are thickened with filler to give the paste viscosity which is the desired type of material for application. A polymer commonly used for sealant production is a polydiorganosiloxane having a degree of polymerization of from about 200 to about 1000. A polydimethylsiloxane having hydroxyl endblocking and a degree of polymerization of 450 has a viscosity of about 12 Pa.s at 25° C. and a molecular radius of gyration of about 1300 to 1500 angstroms (0.13 to 0.15 micrometers). A similar polydimethylsiloxane having a degree of polymerization of 850 has a viscosity of about 50 Pa.s at 25° C. and a molecular radius of gyration of about 1800 to 2000 angstroms (0.18 to 0.2 micrometers).

The chemical nature of the polymer is not thought to be important, as long as the polymer is essentially a linear polymer and one which does not chemically interact with the filler. Useful polymers include polysiloxanes, polyurethanes, polysulfides, polyacrylics, and polychloroprenes.

The fillers used in this invention are of two distinct sizes. The larger particle size filler (filler 1) has an average particle diametere of from 0.5 to 10 micrometers and is also at least 10 times the average particle diameter of the small particle size filler. The small particle size filler (filler 2) has an average particle diameter of less than 0.1 micrometers. In order for the filler 2 to provide reinforcement to the polymer, it is preferred that the particle diameter is of the same order of magnitude as the radius of gyration of the polymer being used. The large particle size filler must have an average particle diameter at least 10 times that of the small particle size filler, it is preferred that the difference be on the order of 100 times.

The fillers can be any of the commonly used extending fillers such a ground quartz, calcium carbonate, titanium dioxide, glass, clay, aluminum oxide, aluminum silicate, iron oxide, barium sulfate, and zinc sulfate. Fillers which have a roughly spherical shape are preferred over those which are platelets, such as mica. Preferred is calcium carbonate as it is readily available in the required sizes. The filler chosen must be one which does not react with the polymer being used, or a filler which has been coated to prevent any reaction which might take place. When the polymer used is a hydroxyl endblocked polydiorganosiloxane a preferred filler is calcium carbonate having a calcium stearate coated surface; the coating of calcium stearate prevents interaction between the hydroxyl units on the silicone polymer and the hydroxyl units which may be present on the surface of untreated calcium carbonate. A filler which reacts strongly with the polymer causes elastic properties to appear, which prevent or inhibit the extrudability and mixing of mixtures.

If fillers are used which vary significantly from that of the calcium carbonate used for the examples, it will be necessary to adjust the amounts used as the phenomena herein is most probably volume related rather than weight related, but it is more convenient to refer to amounts by weight as this is how they are actually measured.

When the polymer used is a polydiorganosiloxane, it is preferred that it be a polydimethylsiloxane having a degree of polymerization of from 200 to 1000. The preferred filler is calcium carbonate because of its cost and ready availability. A preferred large particle size filler is calcium stearate coated calcium carbonate having an average particle diameter of about 3 micrometers. Such a filler is obtainable from Georgia Marble Company of Tate, Georgia, under the identification of CS-11. A preferred small particle size filler is calcium stearate coated calcium carbonate having an average particle diameter of about 0.04 micrometers. Such a filler is obtainable from Shiraishi Kogyo Kaisha, Ltd. of Tokyo, Japan, under the identification of Hakuenka CC. The small particle size fillers are producable by precipitation methods.

The compositions of this invention can be further compounded with a curing means to give compositions which can be cured. In the case of the hydroxyl endblocked polydiorganosiloxanes, any of the common well known curing systems can be used. Preferred are those systems which cure upon exposure to moisture such as are used in the commercial sealants and those which are two parts which cure upon mixing together at room temperature. A preferred cure system adds, under anhydrous conditions, a mixture of 50 percent by weight methyltriacetoxysilane and 50 percent by weight ethyltriacetoxysilane, and a tin catalyst such as dibutyltindilaurate. A preferred two part system adds a catalyst mixture which contains a crosslinking agent such as normalpropylorthosilicate and a catalyst such as dibutyltindilaurate.

The following examples are included for illustrative purposes only and should not be construed as limiting the invention which is properly set forth in the appended claims. All parts or percent are by weight.

EXAMPLE 1

A series of compositions were prepared with had varying amounts of large particle size filler and small particle size filler.

Sample 1 was prepared as follows: 49 parts of a hydroxyl endblocked polydimethylsiloxane having a viscosity of about 12 Pa.s at 25° C. and about 10 percent of the endblockers being trimethylsiloxy (Dp of about 450) was mixed in a dental mixer with 1.5 parts of hydroxyl endblocked polydimethylsiloxane fluid having a viscosity of about 0.04 Pa.s at 25° C. and about 4 weight percent silicon-bonded hydroxyl radicals for one minute. Then 49.5 parts of calcium carbonate filler having a particle diameter of about 0.04 micrometers and a surface treated with calcium stearate (filler 2) was mixed in by adding about ½ of the filler and mixing for one minute, then adding the remainder of the filler and mixing for 4 minutes.

Samples 2 through 6 were prepared in a similar manner, but using a mixture of large particle size filler of calcium stearate treated calcium carbonate filler having an average particle diameter of about 3 micrometers (filler 1) in the amount shown in Table I and the amount of small size particle filler (filler 2) shown in Table I.

The filler 1 was mixed with the plasticizer-polymer mixture for 1 minute, ⅓ of the filler 2 was added and mixed for one minute, than the remainder of filler 2 was added and mixed for 3 minutes.

Sample 7 was prepared in a similar manner, except the filler 2 was added and mixed for 3 minutes, then filler 2 was added and mixed for 2 minutes. Sample 8 was prepared by adding ½ of filler 1, mixing for one minute, then adding the remainder and mixing for 4 minutes.

Each sample was then tested for extrusion rate, slump, yield stress, and viscosity. Slump was determined in accordance with ASTM D 2202, extrusion rate in accordance with Mil-S-8802D using 90 psi pressure, and yield stress with a cone and plate rheometer, and viscosity in accordance with ASTM D 1084. Yield stress is a value obtained from a plot of shear rate versus shear stress as measured on a cone and plate rheometer. A value of greater tha approximately 500 Pascal is necessary in this case to obtain a composition which does not slump.

Each sample was then catalyzed by mixing 100 parts of the base with 8.3 parts of a catalyst mixture so that the catalyzed composition contained about 100 parts of polymer, 4 parts of normal propylorthosilicate, and 0.2 part of dibutyltindilaurate. The catalyzed sample was pressed into a sheet about 0.125 inches thick in a press and allowed to cure for 24 hours under pressure. Each sheet was then removed from the press, cured for 7 days at room conditions, and then cut into tensile bars and measured for tensile strength and elongation in accordance with ASTM d 412. The results are shown in Table I.

EXAMPLE 2

A series of silicone sealants were prepared on pilot plant equipment using varying ratios of large and small size particle calcium carbonate filler.

First, 49.25 parts of the polymer of Example 1 and 1.5 parts of the plasticizer of Example 1 were added to the mixer and mixed for 3 minutes at 300 rpm and full vacuum. Then filler 1 was added and mixed for 2 minutes at 650 rpm. Then ⅓ of filler 2 was added and mixed at 650 rpm for 3 minutes, repeating 2 more times to complete the filler addition. A final mix consisted of 4 minutes at 1000 rpm at full vacuum and then 700 rpm for 2 minutes without vacuum.

The samples were then catalyzed, molded, and tested as above with the results shown in Table II.

TABLE II

| Sample | Filler 1 | Filler 2 | Extrusion Rate g/min. | Slump inch | Tensile Strength psi | Elongation percent | Durometer Shore A |
|---|---|---|---|---|---|---|---|
| 1 | none | 49.25 | 27.2 | nil | 258 | 240 | 47 |
| 2 | 1.25 | 48.0 | 21.6 | nil | 243 | 250 | 46 |
| 3 | 2.5 | 46.7 | 36.2 | nil | 253 | 240 | 46 |
| 4 | 6.0 | 43.2 | 90.2 | nil | 237 | 280 | 47 |

Filler 1 is 3 micrometers average particle diameter
Filler 2 is 0.04 micrometer average particle diameter

EXAMPLE 3

A series of samples were prepared to illustrate the control of viscosity possible by varying ratios of large and small size particle calcium carbonate filler.

Samples were prepared as in Example 2, using the same ingredients, but using the parts of filler 1 and filler 2 as shown in Table III. The extrusion rate was measured in the manner of Example 1 with the results shown. The viscosity of the composition was measured at three different temperatures, 25, 50, and 75° C. using a Haake, RV-20, Cone and Plate Rheometer with the results shown in the table. Sample 1 rises in viscosity as the temperature rises, samples 2 and 3 remain the same, and samples 4 and 5 fall in viscosity as the temperature is raised. By adjusting the ratio of large particle to small particle size filler, the change in viscosity with change in temperature can be varied as desired.

TABLE I

| Sample | Filler 1 | Filler 2 | Extrusion Rate g/min. | Slump inch | Tensile Strength psi | Fluid Yield Strees (Pascals) | Viscosity centipoise |
|---|---|---|---|---|---|---|---|
| 1 | none | 49.5 | 23 | nil | 240 | 1440 | 330,000 |
| 2 | 1.5 | 48.0 | 31 | 0.07 | 293 | 2001 | 312,000 |
| 3 | 2.5 | 47.0 | 48 | nil | 244 | 2005 | 282,000 |
| 4 | 5.0 | 44.5 | 92 | 0.07 | 236 | 903 | 177,000 |
| 5 | 12.5 | 37.0 | 107 | nil | 231 | 964 | 182,000 |
| 6 | 24.8 | 24.8 | 280 | 1.6 | 157 | 122 | 46,000 |
| 7 | 37.0 | 12.5 | 440 | 4+ | *** | 50 | 27,000 |
| 8 | 49.5 | none | 620 | 4+ | *** | 12 | 19,000 |

Filler 1 is 3 micrometers average particle diameter
Filler 2 is 0.04 micrometer average particle diameter
***not measured/marginal tensile

TABLE III

| Example | CaCO3 part. size | CaCO3 wt. percent | Extrusion Rate (g/min) | Viscosity @ 15 sec-1 @ 25C (cP) | @ 50C (cP) | @ 75C (cP) |
|---|---|---|---|---|---|---|
| 1 | 0.04 microns | 49.3 (treated) | 22.3 | 161K | 180K | 240K |
| 2 | 0.04 microns 3.0 microns | 48.3 1.0 (treated) | 93 | 120K | 127K | 130K |

TABLE III-continued

| Example | CaCO3 part. size | CaCO3 wt. percent | Extrusion Rate (g/min) | Viscosity @ 15 sec-1 @ 25C (cP) | @ 50C (cP) | @ 75C (cP) |
|---|---|---|---|---|---|---|
| 3 | 0.04 microns<br>3.0 microns | 47.3<br>2.0<br>(treated) | 110 | 110K | 108K | 100K |
| 4 | 0.04 microns<br>3.0 microns | 41.1<br>8.2<br>(treated) | 180 | 92K | 85K | 73K |
| 5 | 0.04 microns<br>3.0 microns | 25.0<br>24.3<br>(treated) | 380 | 77K | 67K | 60K |

That which is claimed is:

1. A composition of polymer and filler having improved extrusion properties consisting essentially of
   (A) 100 parts by weight of polymer having a degree of polymerization of at least 200,
   (B) from 0 to 5 parts by weight of plasticizer,
   (C) from 50 to 150 parts by weight of filler mixture, the filler mixture comprising from 0.5 to 50 percent by weight of a large particle size filler having an average particle diameter of from 0.5 to 10 micrometers and from 50 to 99.5 percent by weight of a small particle size filler having an average particle diameter of less than 0.1 micrometers, the large particle size filler having an average particle diameter of at least 10 times the average particle diameter of the small particle size filler, and
   (D) optionally, a cure system for the polymer (A).

2. The composition of claim 1 in which the polymer is a siloxane.

3. The composition of claim 2 in which the siloxane polymer has a viscosity of from 10 to 100 Pa.s at 25° C.

4. The composition of claim 3 in which the siloxane polymer is hydroxyl endblocked.

5. The composition of claim 4 in which the filler mixture comprises a mixture of calcium carbonates.

6. The composition of claim 5 in which the large particle size filler has an average particle diameter of about 3 micrometers.

7. The composition of claim 6 in which the small particle size filler has an average particle diameter of about 0.04 micrometers.

8. The composition of claim 7 in which the calcium carbonate fillers are treated with calcium stearate.

9. The composition of claim 8 in which there is also present a curing means.

10. A method of controlling pumpability of a mixture of linear polymer and filler consisting essentially of mixing
    (A) 100 parts by weight of polymer having a degree of polymerization of at least 200,
    (B) from 0 to 5 parts by weight of plasticizer,
    (C) from 50 to 150 parts by weight of filler mixture, the filler mixture comprising from 0.5 to 50 percent by weight of a large particle size filler having an average particle diameter of from 0.5 to 10 micrometers and from 50 to 99.5 percent by weight of a small particle size filler having an average particle diameter of less than 0.1 micrometers, the large particle size filler having an average particle diameter of at least 10 times the average particle diameter of the small particle size filler, and
    (D) optionally, a cure system for the polymer (A).

* * * * *